(12) United States Patent
Fandella

(10) Patent No.: US 7,360,643 B1
(45) Date of Patent: Apr. 22, 2008

(54) ELECTROCONDUCTIVE MODULAR BELT

(75) Inventor: Sergio Fandella, Mogliano Veneto (IT)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/725,863

(22) Filed: Mar. 20, 2007

(51) Int. Cl.
*B65G 17/00* (2006.01)

(52) U.S. Cl. .................................. 198/850; 198/321

(58) Field of Classification Search ............. 198/850, 198/502.1, 321, 327, 333
See application file for complete search history.

(56) References Cited

U.S. PATENT DOCUMENTS

| | | | | |
|---|---|---|---|---|
| 5,217,110 A | * | 6/1993 | Spangler et al. ............ | 198/852 |
| 5,921,378 A | * | 7/1999 | Bonnet ....................... | 198/850 |
| 6,227,356 B1 | * | 5/2001 | Van Zijderveld et al. ... | 198/850 |
| 6,474,464 B1 | * | 11/2002 | Horton et al. .............. | 198/853 |

* cited by examiner

Primary Examiner—Douglas A Hess
(74) Attorney, Agent, or Firm—Hodgson Russ LLP

(57) ABSTRACT

A modular belt having plug-inserts produced from electroconductive material. The plugs may be snapped into respective holes that are preformed or machined in a standard plastic belt module. The modules may be produced from low cost materials such as polypropylene or polyacetal. The electroconductive plugs may be attached to the belt in numerous ways including, but not limited to, snap fit, gluing, screwing or direct integration by molding.

29 Claims, 5 Drawing Sheets

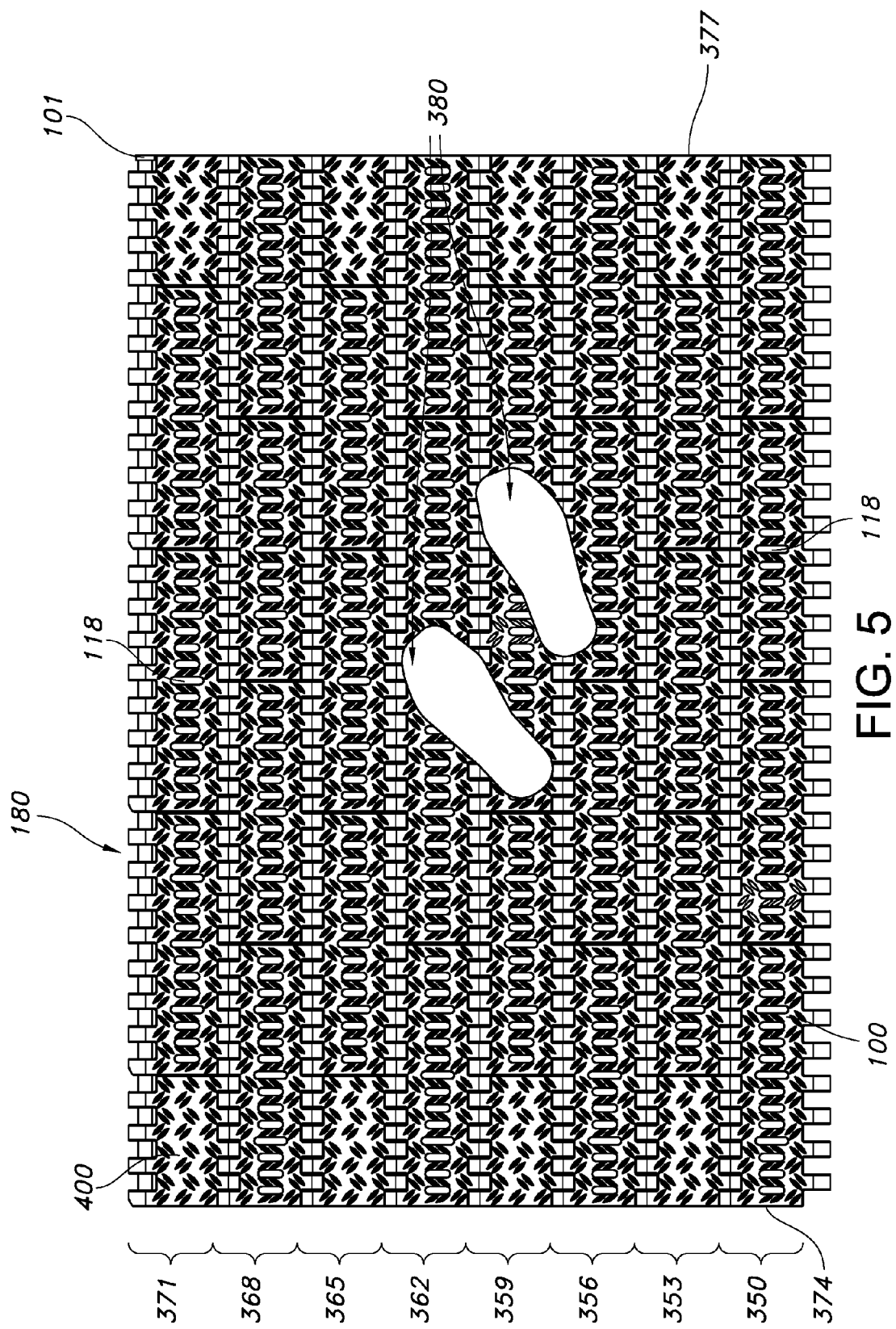

ELECTROCONDUCTIVE MODULAR BELT

FIELD OF THE INVENTION

The present invention pertains to modular conveying belts of the type used for conveying goods or people.

BACKGROUND OF THE INVENTION

Electroconductive belts are widely used for the transport of goods that should not be exposed to the discharge of static electricity. Such products may include electronic devices and other kinds of goods that may be damaged due to exposure to static electricity. Another application where static electricity is undesirable is people mover belts. With the use of conductive materials, static electricity can be discharged through the belt to the metal frame of the machine.

Industrial standards such as EN 61340 define the requirements for conductive materials and applications, as they relate to the discharge of static electricity. The required level of conductivity may vary for different industrial applications. A typical electrical resistance for materials suitable for the dissipation of static electricity is $10^2$-$10^5$ $\Omega$(Ohm). Unfortunately, belts produced from electroconductive materials such as electroconductive polyacetal or electroconductive polypropylene are very expensive. Costs of such materials may range from two to three times the cost of standard plastic materials. The plastic compounds usually contain stainless steel fibers, carbon black fibers, or powders to make them conductive.

In order to reduce the cost, it is common to assemble modular belts in a bricklayed module pattern by combining standard plastic modules with electroconductive modules. The distance between the electroconductive modules must be small enough to always guarantee contact inside the surface size of a standard shoe. For belt modules having a small pitch, it is not difficult to position the modules to meet this requirement. Various patterns for mixing the electroconductive modules with standard plastic modules are possible. Referring to FIG. 1, an example of a prior art bricklayed belt 10 for a people mover application includes standard modules 13 and electroconductive modules 16. The footprints 19 of the user contact at least one electroconductive module 16 to dissipate the static electricity. This type of belt is lower in cost than a belt constructed of all electroconductive modules, but the belt may still be expensive for some applications. For larger module sizes (e.g., belts having pitches equal or larger than two inches), mixed module patterns as described above need a more dense arrangement of the electroconductive modules, which increases the cost of the belt. Accordingly, there is a need for a solution that guarantees sufficient electroconductivity at a lower cost.

SUMMARY OF THE INVENTION

The present invention meets the above-described need by providing a modular belt having plug-inserts produced from electroconductive material. The plugs may be snapped into respective holes that are preformed or machined in a standard plastic belt module. The modules may be produced from low cost materials such as polypropylene or polyacetal. The electroconductive plugs may be attached to the belt in numerous ways including, but not limited to, snap fit, gluing, screwing or direct integration by molding.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
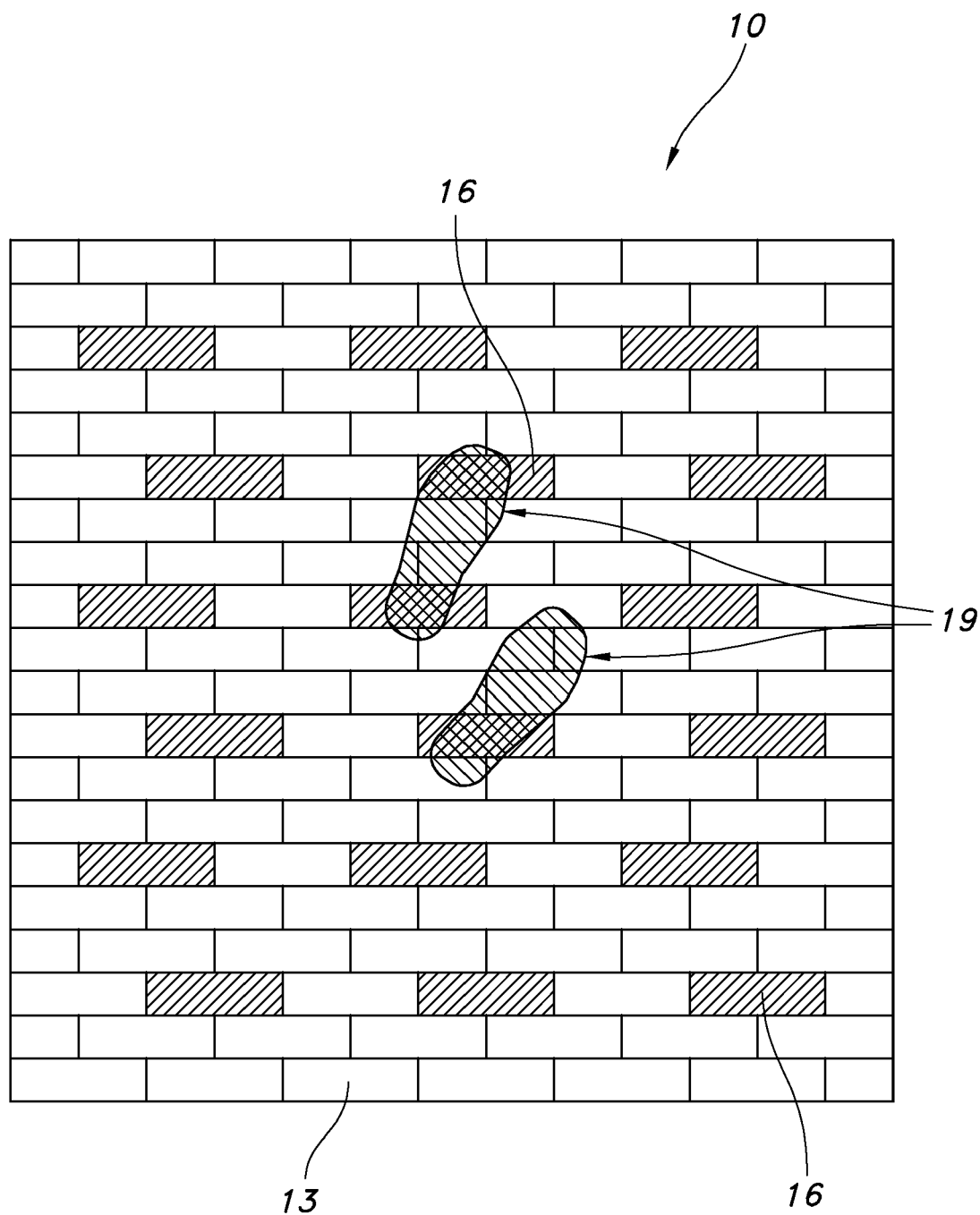
FIG. 1 is a plan view of a prior art belt for a people mover application with mixed modules.
Figure 2:
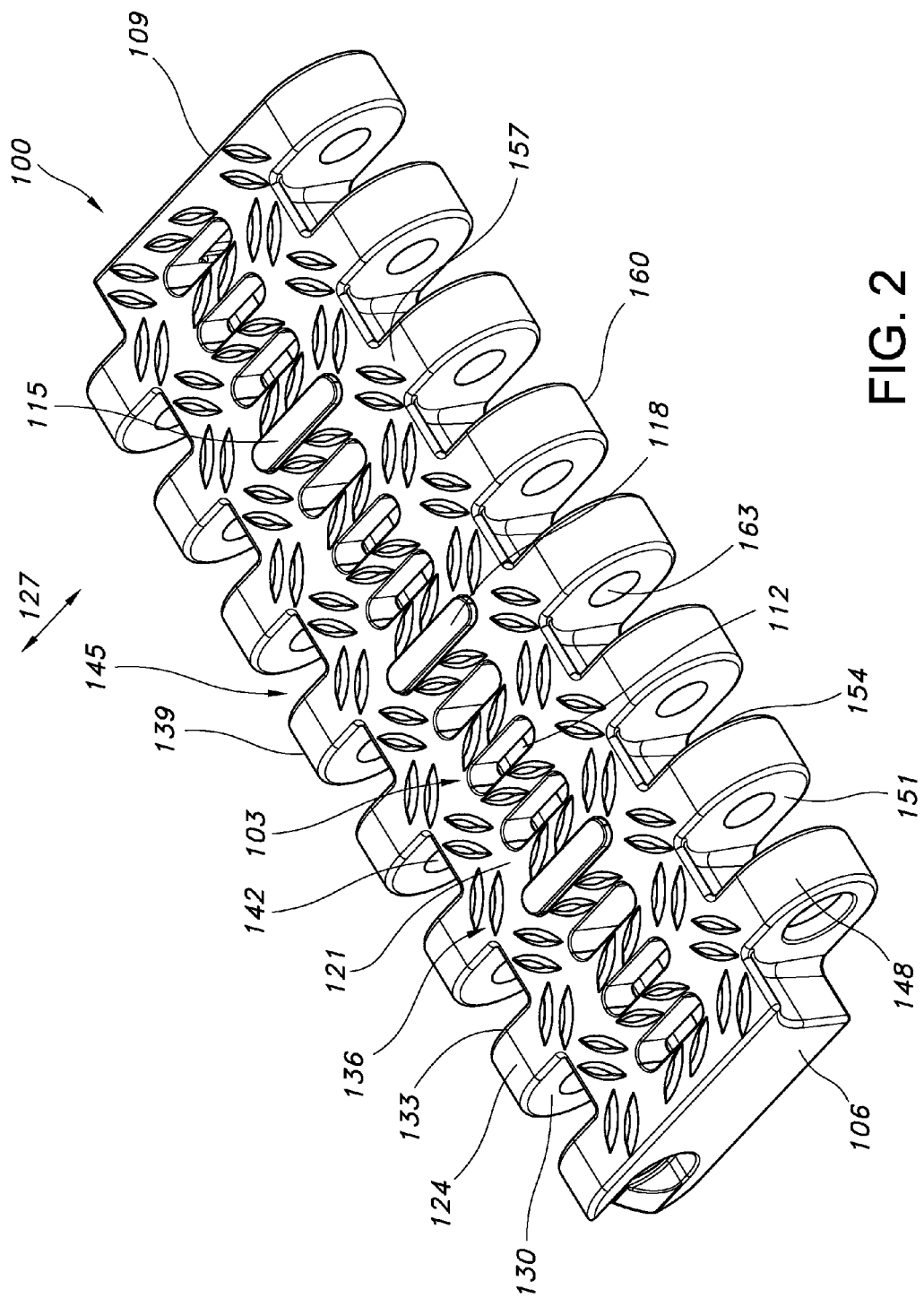
FIG. 2 is a top perspective view of a belt module according to the present invention.

Referring to FIGS. 2-5 generally and initially to FIG. 2, a belt module 100 has an intermediate section 103 extending from a first side edge 106 to a second side edge 109. The intermediate section 103 may be provided with slots 112 defined therein. The slots 112 may function to remove water or debris from the assembled belt. The intermediate section 103 also includes openings 115 for receiving plugs 118. The plugs 118 are constructed from electroconductive materials. A typical electrical resistance for materials suitable for the dissipation of static electricity is $10^2$-$10^5$ $\Omega$(Ohm). Generally, the resistance values for conductors is in the range of about zero to $10^5$ $\Omega$(Ohm), for dissipators is about $10^5$-$10^{12}$ $\Omega$(Ohm) and for insulators is greater than about $10^{12}$ $\Omega$(Ohm). The plugs 118 extend for a short distance above the top surface 121 of the belt module 100 such that contact with an item (not shown) supported on the top surface 121 of the belt is possible. The plugs 118 also extend below the bottom surface of the module 100 as described below. The plug 118 may be constructed of a unitary member or it could be a composite structure with more than one part in electrical communication. The plugs 118 may be fixed in the openings 115 by numerous methods and devices including, but not limited to, snap fit, gluing, screwing, or direct integration of the plugs 118 by molding.

A first plurality of link ends 124 extend in a direction of belt travel indicated by arrow 127. The first plurality of link ends 124 have a first side wall 130 and a second side wall 133. The first and second side walls 130, 133 define a transverse thickness. The link end 124 has a proximal end 136 where it joins with the intermediate section 103 and has a distal end 139 disposed opposite therefrom. A transverse pivot rod opening 142 extends from the first side wall 130 to the second side wall 133. The first plurality of link ends 124 have spaces 145 disposed therebetween.

A second plurality of link ends 148 extend in the opposite direction from the first plurality of link ends 124. The second plurality of link ends 148 are offset from the first plurality of link ends 124 such that when adjacent modules 100 are juxtaposed the second plurality of link ends 148 fit into the spaces 145. The second plurality of link ends 148 have a first sidewall 151 and a second sidewall 154 defining a transverse thickness. The link end 148 has a proximal end 157 that intersects with intermediate section 103 and has a distal end 160 disposed opposite therefrom. The second link end 148 also includes a transverse opening 163 that extends from the first sidewall 151 to the second sidewall 154.

The module 100 is designed such that like modules 100 can be arranged with the first plurality of link ends 124 on a first module 100 intercalated with the second plurality of link ends 148 on an adjacent module 100. With the adjacent modules 100 intercalated, a transverse pivot rod 101 can be inserted to connect the modules 100 to form a belt 180 (FIG. 5). The belt 180 may be formed in many different ways as will be evident to those of ordinary skill in the art based on this disclosure. The belt 180 may be formed of rows of modules with one module per row. As an alternative, the belt 180 may be formed with multiple modules 100 per row in a "bricklayed" configuration as will be evident to those of ordinary skill in the art based on this disclosure.

Figure 3:
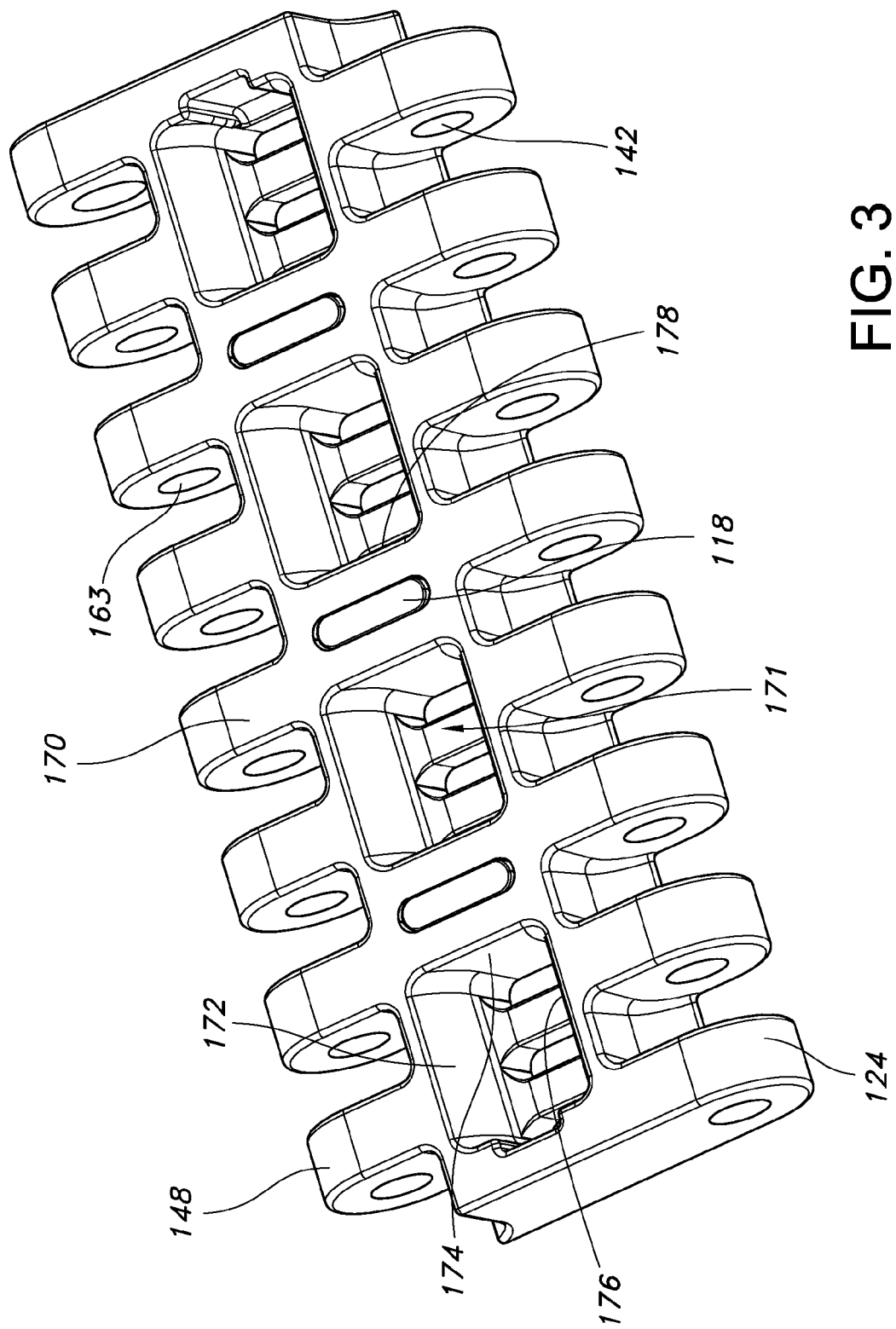
FIG. 3 is a bottom perspective view of a belt module according to the present invention; and, FIG. 4 is a cross sectional view of a module according to the present invention with an electroconductive plug insert installed therein; and, FIG. 5 is a top plan view of a modular belt according to the present invention used in a people mover application.

In FIG. 3, the bottom surface 170 of belt module 100 is shown. The bottom surface 170 borders a cavity 171 formed with walls 172, 174, 176, and 178. The cavity 171 may receive the tooth of a sprocket (not shown) for driving the module 100 as will be evident to those of ordinary skill in the art based on this disclosure.

The electroconductive plugs 118 extend over the full height of the module 100 and should extend slightly below the bottom surface 170 of the module 100 in order to guarantee contact with a support base of the belt 180. The support base is usually constructed from a conductive material such that the static electricity may be discharged over the metal frame of the machine. Another possibility is to use discharge brushes on the bottom of the plugs 118 as will be evident to those of ordinary skill in the art based on this disclosure.

The present invention eliminates the need for molding entire modules from materials having electroconductive properties. In one example of the invention, the plugs 118 can be snapped into respective openings 115. The openings 115 may be pre-formed or machined into the belt modules 100. The module 100 may be produced from standard low cost plastic resins such as polypropylene or polyacetal that may have low conductivity or even be classified as insulators.

Figure 4:
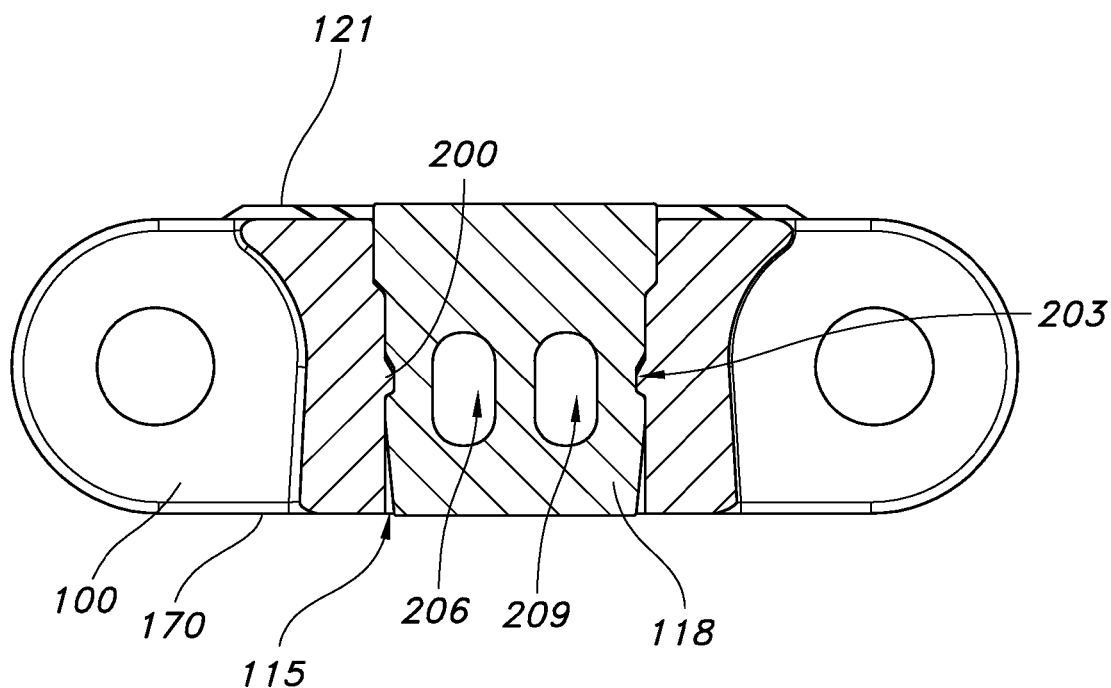

Turning to FIG. 4, one embodiment of the plug 118 is shown. The plug 118 slides into the opening 115 which may be provided with a rib 200 that engages with a recess 203 in the side of the plug 118 to provide a friction fit. As shown, the plug 118 extends from above the top surface 121 of the module to a position below the bottom surface 170 of the module 100. The plug 118 is shown with a pair of cavities 206 and 209 formed therein. The plug 118 may be made from numerous materials have different degrees of flexibility and may or may not be provided with cavities. Also, depending on the method used to fix the plugs 118 to the module 100 there may or may not be a rib 200 and recess 203. Other methods of attachment are also possible as set forth above.

In FIG. 5, a belt 180 is shown with a plurality of rows 350, 353, 356, 359, 362, 365, 368, 371 extending from a first side edge 374 to a second side edge 377 of the belt 180. Each row is comprised of multiple modules 100 and standard modules 400 arranged in bricklayed fashion such that the modules in adjacent rows are staggered so that the seams in each row are out of alignment. As shown, the plugs 118 are spaced such that for a people mover application, the average footprint 380 applied to any portion of the belt 180 will contact at least one plug 118 to dissipate the static electricity.

The number and distribution of the plugs 118 determines the minimum size of an object that will be contacted by at least one plug 118 when supported from any position on the top surface of the belt 180. The level of electroconductivity is determined by the nature of the conductive material used for the plug 118.

The present invention provides many advantages including the reduction of costs by using plugs 118 instead of modules constructed entirely from electroconductive materials. Also, the present invention provides a flexible solution because a specific belt type can be furnished with any number of electroconductive plugs 118. Because the plugs 118 are separate items that are attached to the belt 180, it is easy to produce them with any material particularly suitable for a specific application. This interchangeability allows the user to optimize the electroconductivity performance adapted to the specific application and requirements.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module comprising:
an intermediate section having a top surface and a bottom surface;
a first plurality of link ends extending in a direction of belt travel, the first plurality of link ends having first transverse openings defined therein;
a second plurality of link ends extending in a direction opposite to the first plurality of link ends, the second plurality of link ends having second transverse openings, the second link ends being offset from the first link ends such that adjacently positioned belt modules are capable of intercalating so that the first link ends of one belt module fit into spaces defined between the second plurality of link ends of an adjacent belt module and so that the first and second transverse openings are disposed in alignment;
wherein the module has at least one cavity defined therein; and,
an electroconductive insert disposed in the cavity and extending from the top surface to the bottom surface of the module.

2. The module of claim 1, wherein the electroconductive insert is fixed by integral molding.

3. The module of claim 1, wherein the electroconductive insert is positioned in the cavity by friction fit.

4. The module of claim 1, wherein the electroconductive insert has a resistance in the range of zero to $10^5$ Ohms.

5. The module of claim 1, wherein the electroconductive insert has a resistance in the range of $10^5$ to $10^{12}$ Ohms.

6. The module of claim 1, wherein the electroconductive insert comprises an electroconductive plastic.

7. The module of claim 1, wherein the electroconductive insert comprises a conductive metal.

8. The module of claim 1, wherein the electroconductive insert is glued in the cavity.

9. The module of claim 1, wherein the electroconductive insert is fixed in the cavity by fasteners.

10. The module of claim 1, wherein the module is constructed of an insulative material.

11. The module of claim 1, wherein the module has a rib bordering the cavity, the rib engaging with a recess in the electroconductive insert.

12. The module of claim 1, wherein the electroconductive insert has a chamber defined therein.

13. The module of claim 1, wherein the module has a second cavity extending from the bottom surface.

14. The module of claim 1, wherein the top surface of the module has openings for cleaning.

15. A modular belt comprising:
a first plurality of belt modules having an intermediate section with a top surface and a bottom surface, the first plurality of belt modules having a first plurality of link ends extending in a direction of belt travel, the first plurality of link ends having first transverse openings defined therein; a second plurality of link ends extending in a direction opposite to the first plurality of link ends, the second plurality of link ends having second transverse openings; wherein the module has at least one cavity defined therein; an electroconductive insert disposed in the cavity and extending from the top surface to the bottom surface of the module;
a second plurality of belt modules having an intermediate section; the second plurality of belt modules having a first plurality of link ends extending in a direction of belt travel, the first plurality of link ends having first transverse openings defined therein; a second plurality of link ends extending in a direction opposite to the first plurality of link ends, the second plurality of link ends having second transverse openings;
wherein the first link ends on the first plurality of belt modules are capable of intercalating with the second link ends on the second plurality of belt modules to form a belt capable of articulating about a sprocket; and,
at least one pivot rod capable of being installed in aligned transverse openings of the first and second belt modules.

16. The modular belt of claim 15, wherein the electroconductive insert is fixed by integral molding.

17. The modular belt of claim 15, wherein the electroconductive insert is positioned in the cavity by friction fit.

18. The modular belt of claim 15, wherein the electroconductive insert has a resistance in the range of zero to $10^5$ Ohms.

19. The modular belt of claim 15, wherein the electroconductive insert has a resistance in the range of $10^5$ to $10^{12}$ Ohms.

20. The modular belt of claim 15, wherein the electroconductive insert comprises an electroconductive plastic.

21. The modular belt of claim 15, wherein the electroconductive insert comprises a conductive metal.

22. The modular belt of claim 15, wherein the electroconductive insert is glued in the cavity.

23. The modular belt of claim 15, wherein the electroconductive insert is fixed in the cavity by fasteners.

24. The modular belt of claim 15, wherein the module is constructed of an insulative plastic.

25. The modular belt of claim 15, wherein the module has a rib bordering the cavity, the rib engaging with a recess in the electroconductive insert.

26. The modular belt of claim 15, wherein the electroconductive insert has a chamber defined therein.

27. The modular belt of claim 15, wherein the module has a second cavity extending from the bottom surface.

28. The modular belt of claim 15, wherein the top surface of the module has openings for cleaning.

29. A method of forming a modular belt capable of dissipating static electricity, the method comprising:
providing a first plurality of belt modules having an intermediate section with a top surface and a bottom surface, the first plurality of belt modules having a first plurality of link ends extending in a direction of belt travel, the first plurality of link ends having first transverse openings defined therein; a second plurality of link ends extending in a direction opposite the first plurality of link ends, the second plurality of link ends having second transverse openings; wherein the module has at least one cavity defined therein; an electroconductive insert disposed in the cavity and extending from the top surface to the bottom surface of the module;
providing a second plurality of belt modules having an intermediate section; the second plurality of belt modules having a first plurality of link ends extending in a direction of belt travel, the first plurality of link ends having first transverse openings defined therein; a second plurality of link ends extending in a direction opposite to the first plurality of link ends, the second plurality of link ends having second transverse openings; wherein the first link ends on the first plurality of belt modules are capable of intercalating with the second link ends on the second plurality of belt modules to form a belt capable of articulating about a sprocket; and,
installing at least one pivot rod in the aligned transverse openings of the first and second belt modules.

* * * * *